Figure 7:
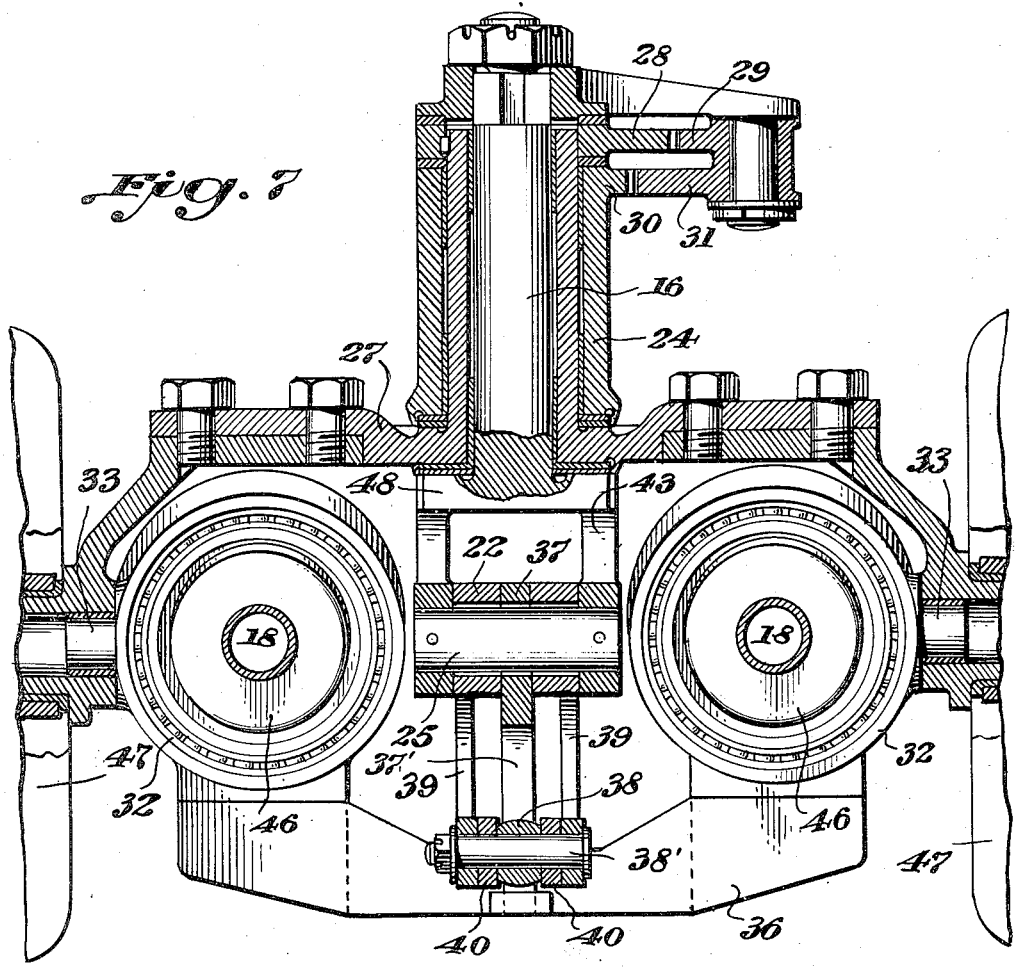

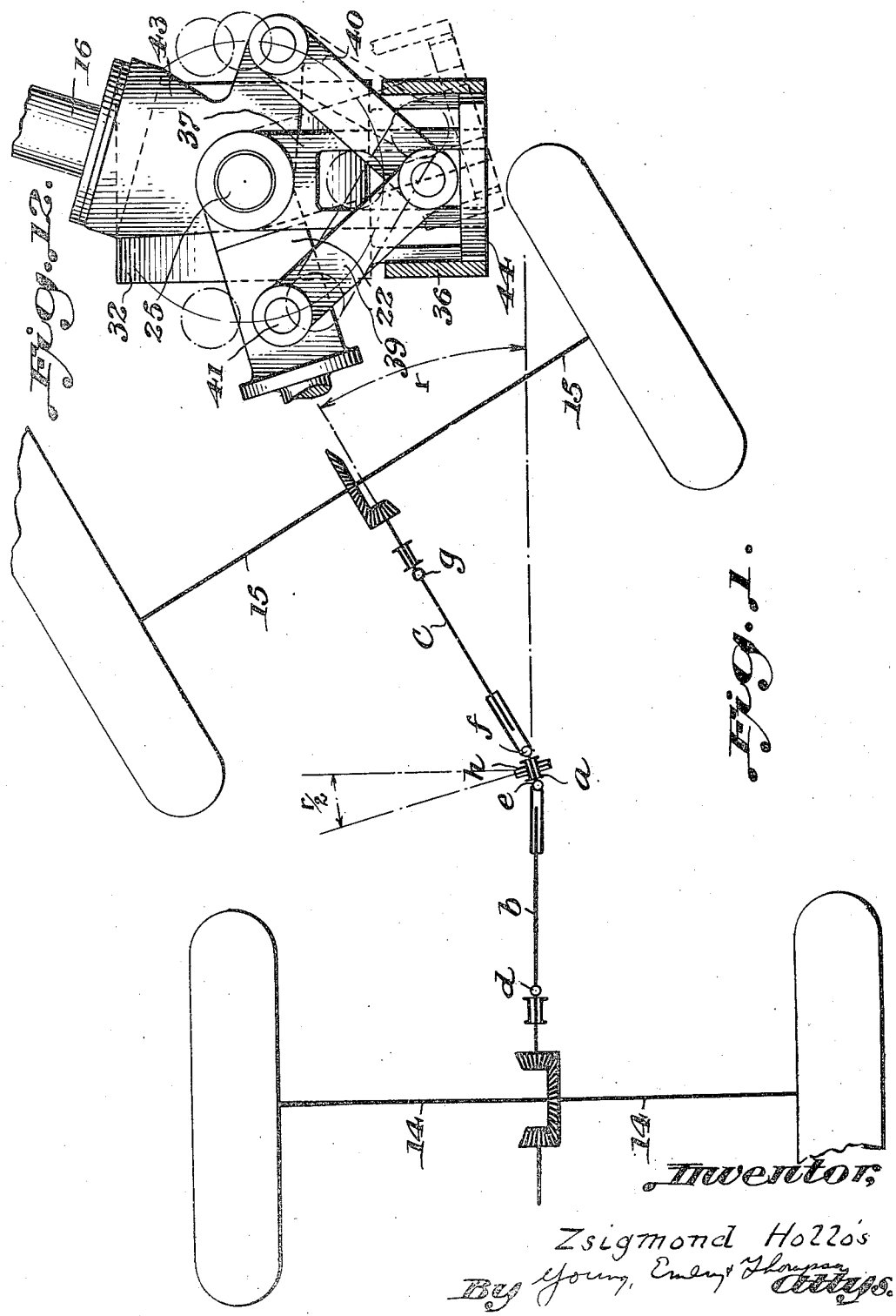

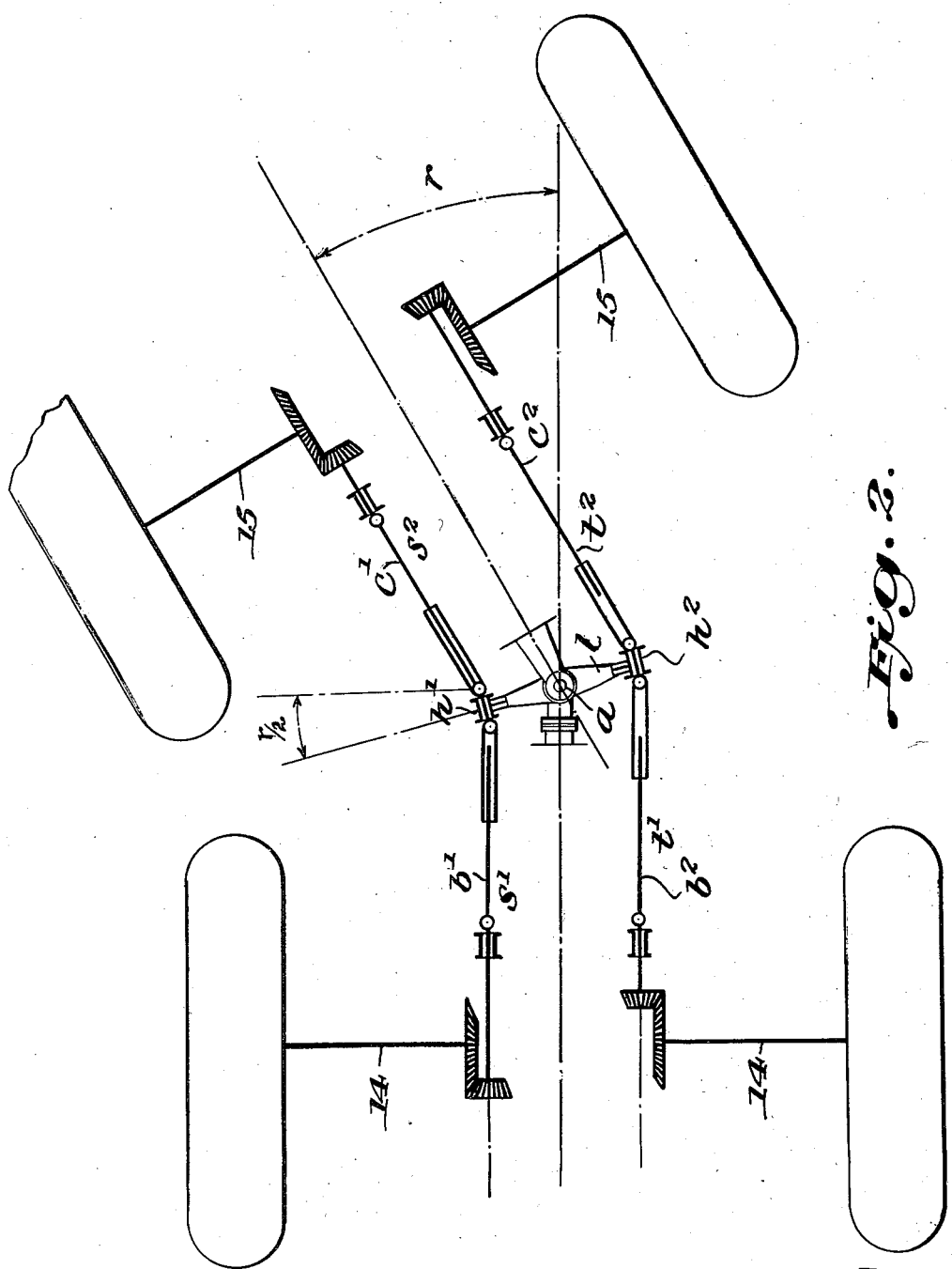

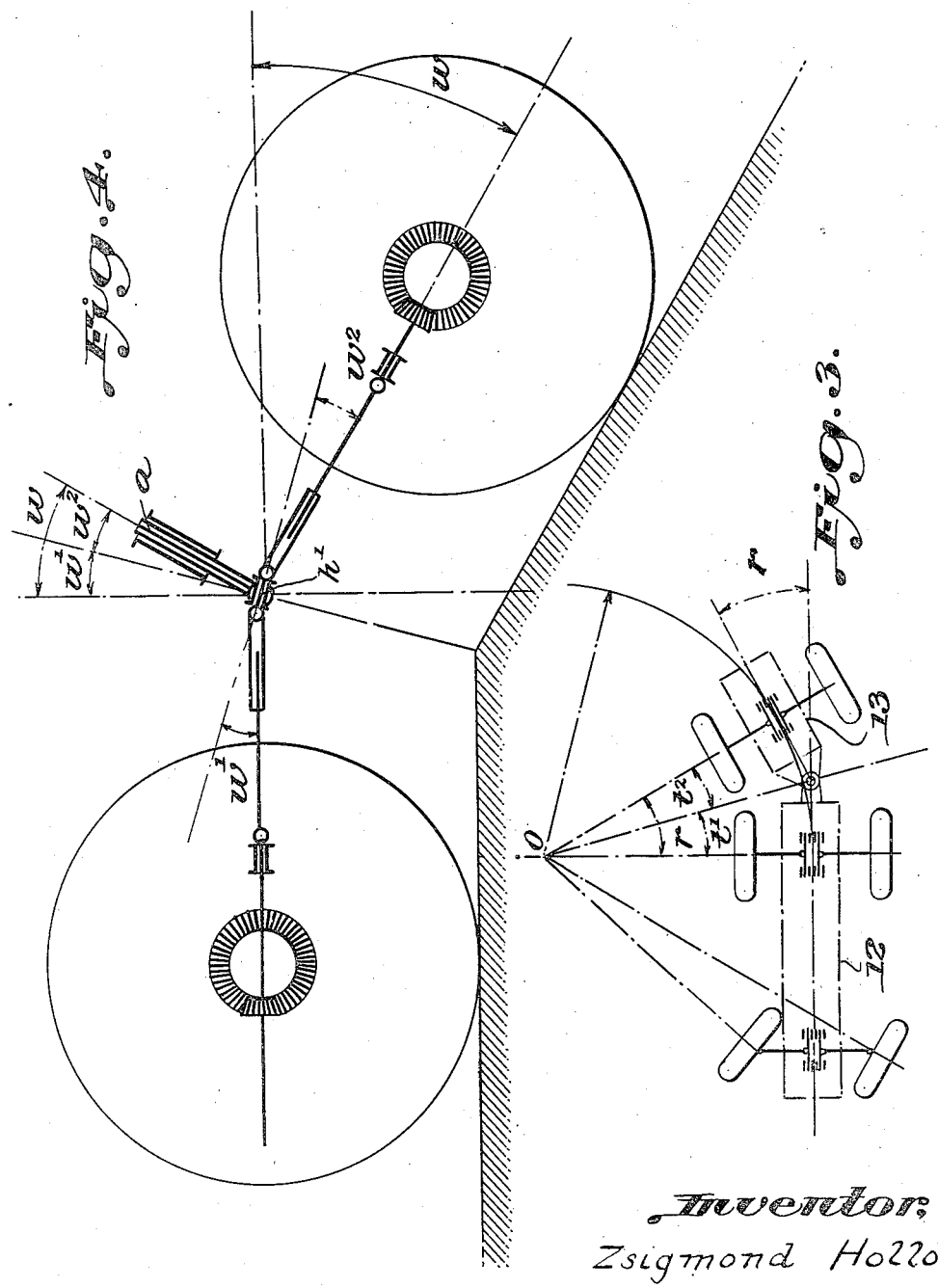

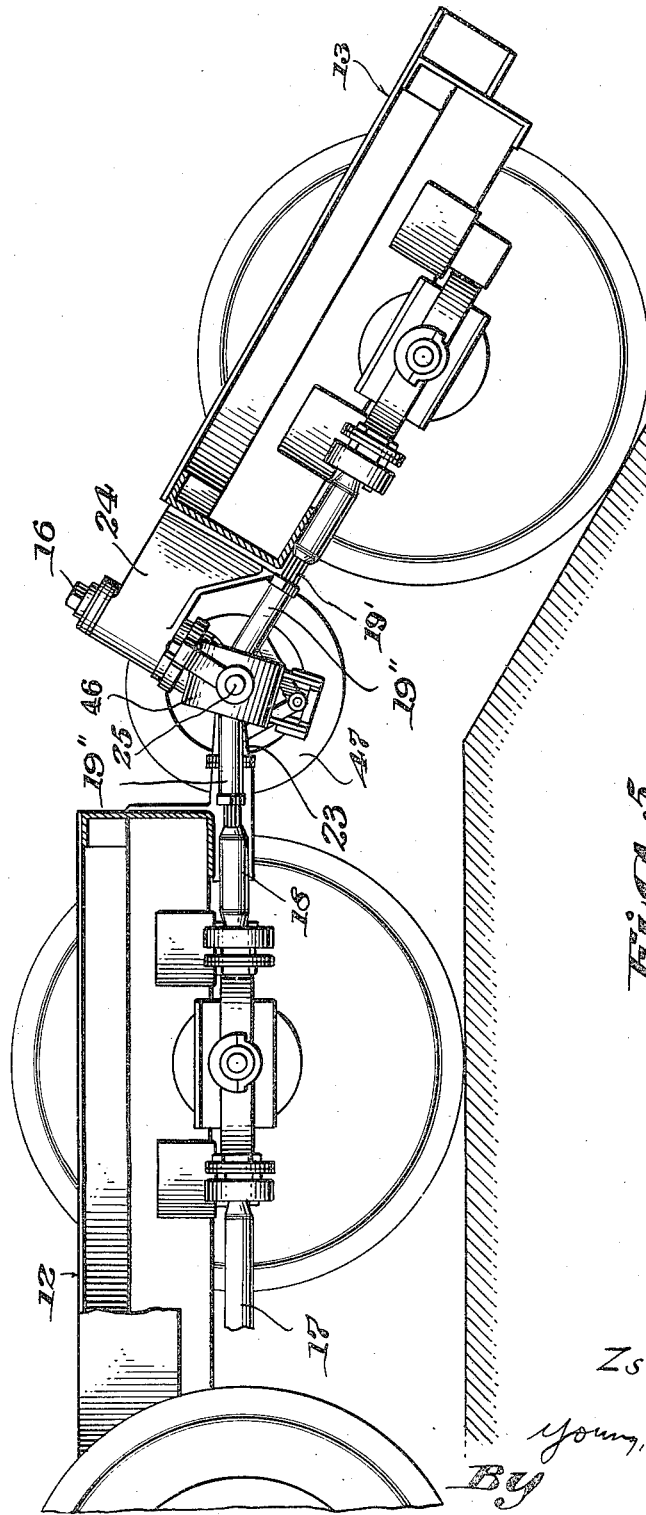

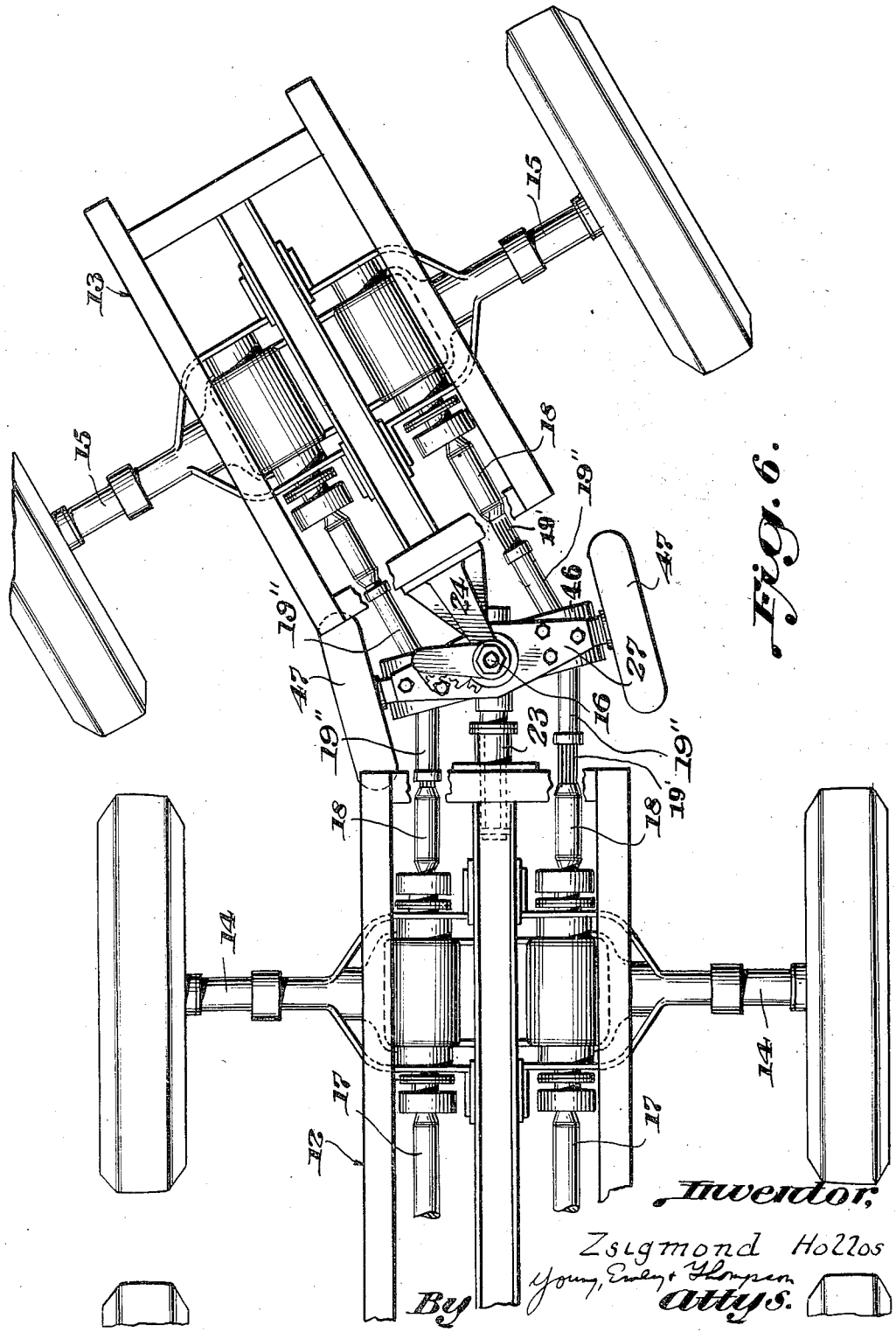

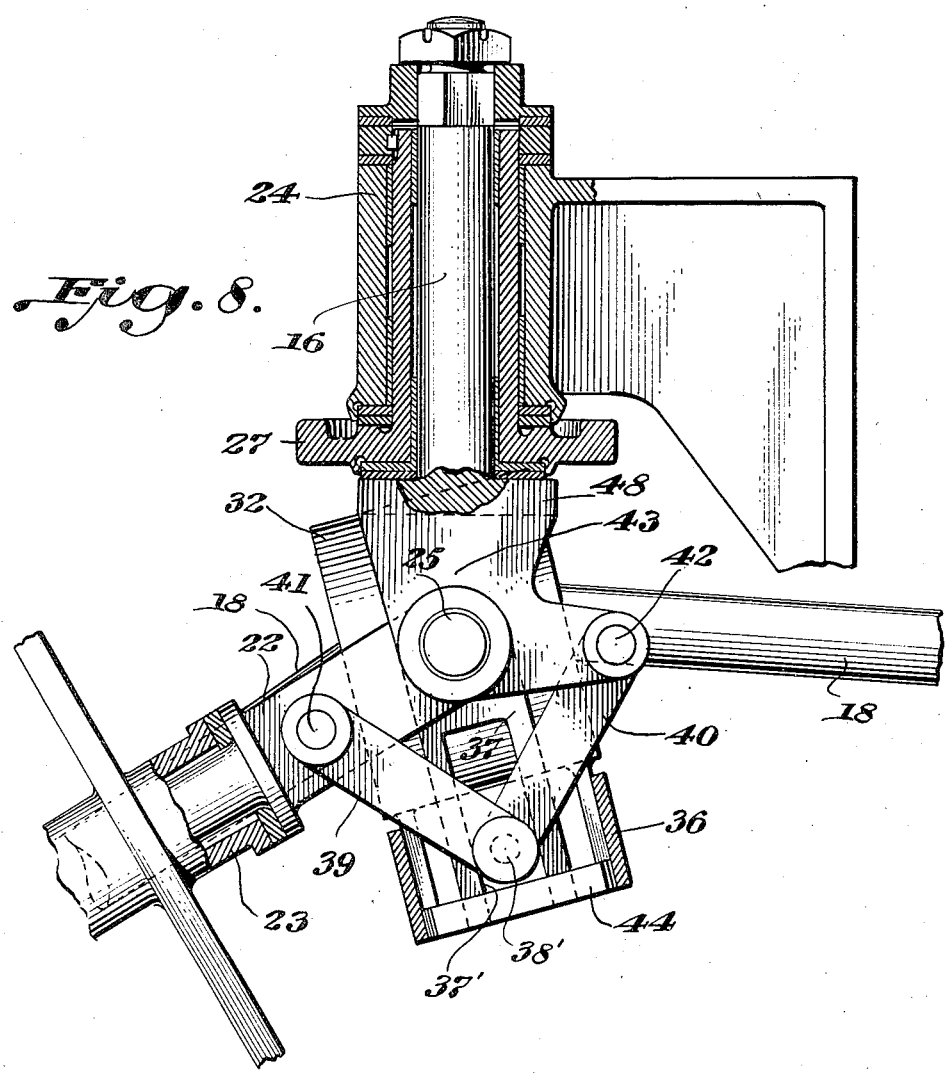

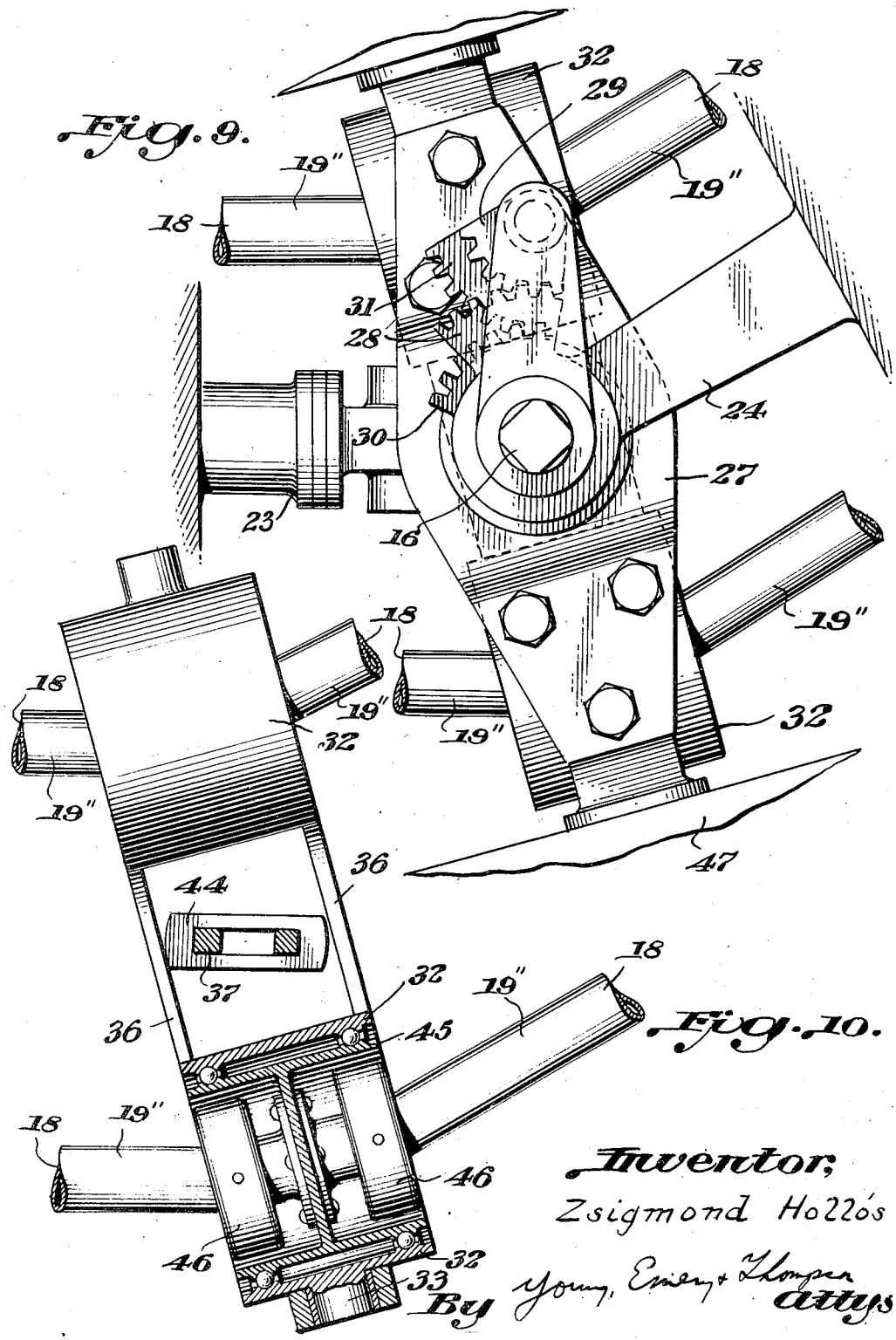

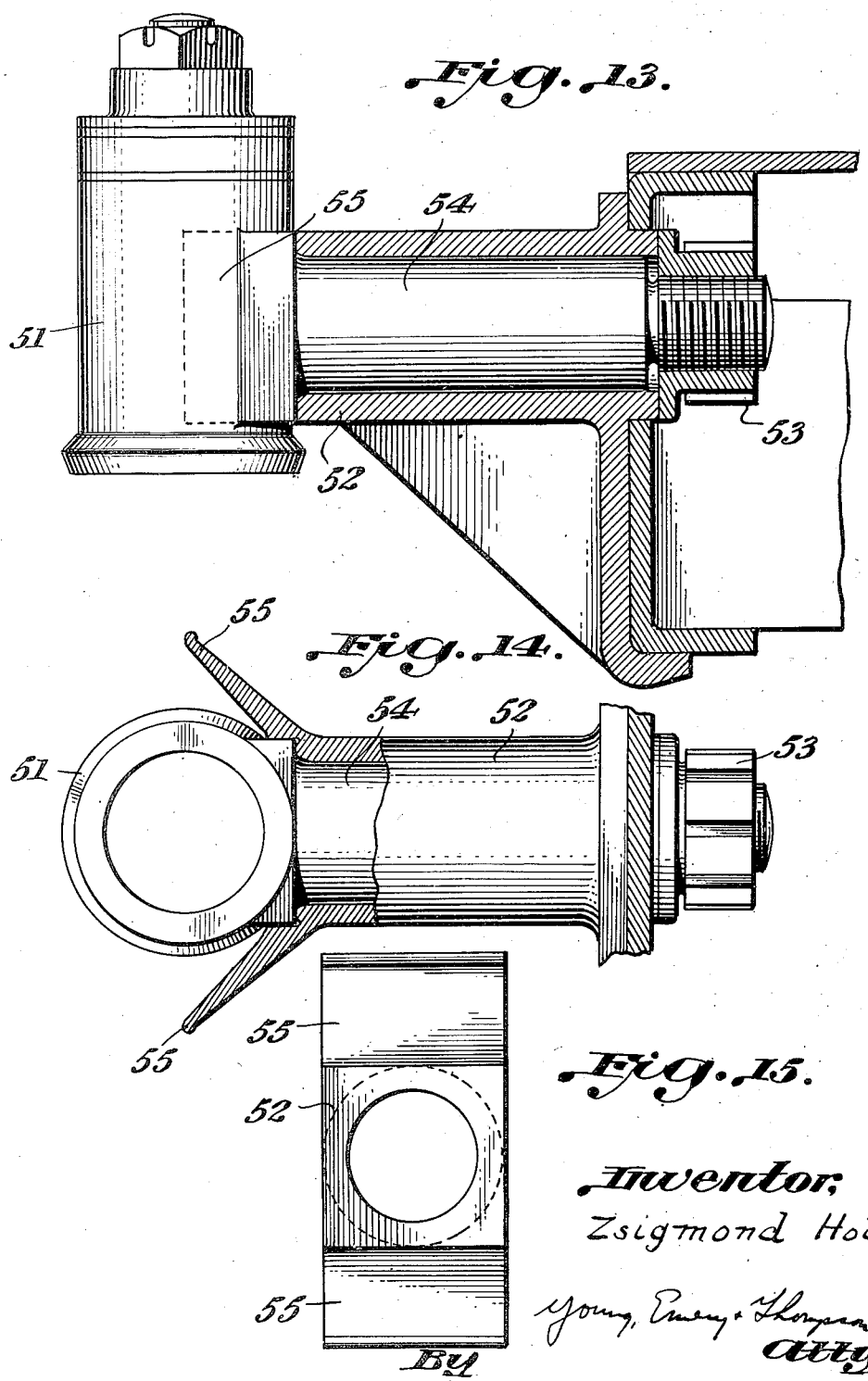

Patented Jan. 1, 1946

2,391,971

UNITED STATES PATENT OFFICE 2,391,971

COUPLING AND DRIVE MECHANISM FOR VEHICLES

Zsigmond Hollós, New York, N. Y.

Application November 3, 1941, Serial No. 417,720

15 Claims. (Cl. 180—14)

The present invention relates to drive mechanism for vehicles, particularly for driving the wheels of trailers and the like. More particularly, this invention relates to mechanism for the driven axles of vehicles of all constructions including road and cross-country vehicles of the wheeled and caterpillar type, and also rail vehicles, and it particularly relates to drive connections for such axles, it being immaterial whether the axles to be connected to the drive belong to one and the same vehicle or to different vehicles. The invention is particularly applicable to the drive of vehicle axles of single axle vehicle elements but is not limited thereto.

The invention consists in providing the coupling for connecting the vehicle elements (chassis), having axles to be placed in driving connection, with a bearing casing for the drive shafts of said axles, which casing is rotatably journalled co-axially with the coupling axes and can be placed in rotary connection or engaged with the coupling members rotatable about the vertical coupling axle whereby said casing can take part in the rotation of the coupled members about said vertical axis while maintaining the driving connection.

The invention is based on the discovery that such a connecting mechanism provides means to diminish the angular displacements of the vehicle elements in traversing curves with respect to the drive to such an extent that the drive is preserved and loss of power substantially avoided. According to the invention the drive connection of the drive shafts for the axles to be placed in driving connection is established by means of a member mounted in the bearing casing wherein the drive shafts to be coupled are jointedly or pivotally mounted. The arrangement is such that the coupling for the frames of the individual axles is movable at least about a vertical pivot and on this pivot is rotatably or swingably mounted the bearing casing for the intermediate member providing the drive connection of the drive shafts, and between the said casing and the coupling members rotatable about the vertical coupling axes there is a pivot joint whereby the angle of deflection of the drive shafts, for example in rounding a curve, is diminished one half, or to a fraction of the deflection of the coupling, and also the power losses and strain on the drive parts correspondingly reduced. The mechanism has the further advantage that the angles of deflection are brought to equal magnitude whereby irregularity in power transmission is avoided and a smooth drive results.

The invention offers particular advantages for cross-country vehicles with wheel and caterpillar drive. In cross-country driving the chassis elements and the driven axles must be able to rock vertically up and down, in order, for example, in wheeled vehicles to make possible correct contact of the wheels with the ground. For cross-country vehicles the coupling for the vehicles or vehicle elements must therefore be a coupling with vertical and horizontal pivot joints. The arrangement in a coupling of this type is such that also the swinging of the drive members about the horizontal pivot is reduced to one half or a fraction of the deflection of the coupling parts and the drive shafts deflect not only through an angle of half the extent, but also the deflection angles are equalized thereby avoiding irregularities in the transmission of power.

By effecting the drive connection of the drive shafts through an intermediate member journalled in a bearing casing which is rotatably mounted co-axially with the coupling axes the result is achieved that the intermediate member can perform the vertical and horizontal rocking movements independently of each other but also simultaneously and can thus follow all the movements of the vehicle parts and of the driven axles while maintaining the drive connection, and, since the rocking movements in the coupling are transmitted to the drive with a corresponding gear reduction, dangerous stresses in the drive parts can be avoided.

Such a drive mechanism has particular advantages in vehicles with swinging half-axles in which each half axle has its own drive shaft and the drive connection of the separate shafts is independently established. With such a division of the drive the intermediate member forming the drive connection is especially favorable for drive shafts having telescopic parts, wherein the internal drive shaft undergoes an appreciable shortening and the outer drive shaft a corresponding elongation in traversing curves, because it allows equalizing of the longitudinal sliding in both shafts and the total elongation and the total shortening to be distributed evenly on the interconnected joint shafts.

Figure 11:
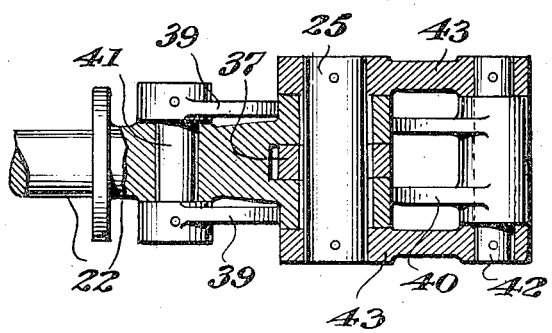

A constructional example of the mechanism according to the invention is illustrated in the accompanying drawings in which:

Figures 1–4 are diagrammatic views showing the operation of the mechanism wherein Fig. 1 shows the operation for rigid axles with one central drive shaft, Fig. 2 shows the operation for swinging half axles with two drive shafts, Fig. 3 shows the general arrangement in traversing curves, and Fig. 4 shows the operation on traversing sloping and and uneven ground, Figs. 5 and 6 are side elevation and plan views respectively of the coupling elements and the vehicle chassis, Fig. 7 is a cross sectional view of the coupling device with vertical and horizontal coupling pivots, Fig. 8 is a side elevation of the coupling device with parts in section, Fig. 9 is a top plan view of the coupling device, Fig. 10 is a part plan view and part sectional view of the power translating means for the drive shafts through the coupling, Fig. 11 is a horizontal sectional view through the horizontal pivot, Fig. 12 is a side view of the coupling device, Fig. 13 is a vertical sectional view of a modified coupling device, Fig. 14 is a top plan view of the coupling device of Fig. 13, and Fig. 15 is an end view of a detail of the coupling device.

Figs. 5 to 12 are structures according to the diagram of Fig. 2.

The constructional example shown in the drawings is a wheeled vehicle composed of a header or leading vehicle 12, Figs. 5 and 6, having a plurality of transverse axles 14 and a trailer vehicle 13 with transverse axles 15. The drive motor (not shown) is mounted on the leading vehicle 12 which drives the drive axles 14 and 15 which in this case are half axles. The leading vehicle 12 and the trailer vehicle 13 are coupled together intermediately of the space between the leading vehicle and the trailer, by means of a coupling which allows rotation of the coupled vehicle elements at least about a vertical axle or spindle 16, whereby, when traversing a curve, the two vehicle elements 12 and 13 can dispose themselves at an angle relatively to each other as shown in Fig. 6. The driven axles 14 and 15 in this case are swinging half axles and each half axle is driven by means of its own drive shaft 17 and 18, the arrangement being such that each drive shaft 18 between the vehicles 12, 13 is composed of two telescopically arranged parts 19' and 19'' Figs. 5 and 6, each of which is jointedly or freely pivoted at one of its ends in a joint 46 in such a manner that the drive shaft can swing freely as a unit. The connection of the drive shafts 18 for the axles 14 and 15 to be driven is made in the coupling between the vehicles. The drawings show a coupling with a vertical pivoting axle 16, and a horizontal pivoting axle 25 so that the vehicle trailer 13 coupled to the leading or power vehicle 12 cannot only follow to the vehicle 12 when traversing curves, and dispose itself at an angle to the vehicle 12 but also, owing to its rotatability about the horizontal pivot, can also swing in vertical directions and can thus adjust itself to different levels when the vehicle train is traversing uneven ground, Fig. 5.

In the example shown in the drawings, the horizontal pivot 25 of the coupling engages a hook-shaped connecting member 22 which is pivotally mounted in a bearing block 23, Figs. 5, 6 and 8, connected to the chassis of the leading car 12. The vertical pivot 16 is journalled in a bearing block and bracket 24 connected to the trailer vehicle 13, and the two pivot pins 16 and 25 are connected to each other. The vertical pivot pin 16 has an integral stirrup-shaped member 48 on the lower part thereof and the horizontal pivot pin 25 of the coupling is journalled in the yoke part 43 of the stirrup, Figs. 7 and 8.

Rotary connection between the shafts 18 of the vehicles 12 and 13 is provided by means of a support 27 which is pivotally mounted on the vertical pivot pin 16 of the coupling and is in rotary connection with the bearing block 24 in such a manner that when the vehicle 13 turns with respect to the vehicle 12, for example in traversing a curve, the swinging movement is transmitted to the support 27. The rotary connection is provided as shown in Fig. 7, with a device which transmits a rotation of the bearing block 24 to the support 27 in such a manner that the support 27 turns through only a fraction of the angle of deflection of the block 24. For example, in traversing a curve the support 27 will make only half the deflection of the vehicle chassis 13. In the example shown in the drawing gear segments 28, 29, 30 and 31 are provided between the parts 27 and 24 to be placed in drive connection, the velocity ratio between the gear segments 28 and 29 being 2:1 and that between the gear segments 30 and 31 being 1:1, so that a rotation of the pin 16 and also a turning of block 23, is transmitted to the support 27 in the ratio of 2:1 and the support 27 will thus make only half the deflection of the vehicle.

The support 27 carries a bearing casing 32 for each of the intermediate members forming the driving connections between 18, 18, said bearing casing 32 having a pin 33, Fig. 7, which is journalled in the support 27 co-axial with the horizontal pivot axis 25 of the coupling. The casings 32 for the two drive shafts 18 of the vehicle axle, both swinging half axles, are rigidly connected with each other by a cross-bar 36 in such a manner that the bearing casings 32 take part in every movement of the coupling members, that is, both the movement about the vertical pin 16 in traversing curves, and the movement about the horizontal pivot pin 25 in traversing uneven ground. The turning or rocking movements about the horizontal pivot pin 25 are transmitted to the cross-bar 36 by means of a crank 37 or the like rotatably mounted on the coupling pin 25, Figs. 7, 8, 11 and 12. The crank 37 has a guide recess for a cross head roller 38 or the like, rotatable on a shaft 38' connected by links 39 and 40 to the chassis parts to be coupled or to the coupling blocks 23, 24 connected to said vehicle elements, each being connected to its own link 39 and 40. The links 39 are jointedly connected by means of a pin 41 with the connecting member 22 which is pivoted about its longitudinal axis in the coupling block 23, and the links 40 are jointedly connected by a pin 42 with the vertical pivot pin 16 through the yoke part 43 thereof. On vertical swinging movements of one vehicle element or both vehicle elements, the cross head roller 38 is shifted by means of the links 39 and 40, and this shifting causes the crank 37 to assume such a position that it is located in the center between the two vehicle elements, and bisects the angle of two vehicle elements relatively to each other. Owing to the movements imparted to the crank 37 with the guide recess, which crank is provided with a flange 44 sliding in the cross bar 36, the cross bar 36 is actuated and rotates about the pins 33. Each bearing casing 32 connected with the cross bar 38 forms the bearing for a member 45 of the coupling between each pair of drive shafts 18, in which member 45 the ends of the drive shafts 18, are journalled by means of Cardan joints 46 and preferably can swing freely, Fig. 10. This produces a drive connection which remains operative both in traversing curves, that is, with swinging about the vertical coupling axis, and also in traversing hilly territory when there are vertical swinging movements about the horizontal axis. The shortening of the internal link shaft and an elongation of the external link shafts in traveling curves is made possible by making each shaft of two telescopically engaging parts 19' and 19" one of which parts 19', Fig. 6, is connected at one end to the half axle 15 and the other part 19" at one end to the bearing casing 32 or the member 45 journalled therein, and the free mobility of the drive shafts allows the members 45 to accommodate themselves in such a manner that the shafts and driving connection always lie at equal angles to the member 45 and therefore also have uniform angular velocity of the two connected shafts, both in traversing curves and in going over hilly ground.

To protect the whole coupling mechanism in traversing very uneven ground, rollers, preferably rubber tires 47, or discs may be arranged on the horizontal trunnions 33 or on a separate axis in such a manner that when the ground has such irregularities that these rollers or discs come into contact therewith, they will protect the coupling device from injury thereby.

In straight travel over level ground the one vehicle element follows the other in the same track assuming that the coupling is provided in the middle of the space between the following axles. By arranging the coupling in the middle of the inter-axle space, it is also made possible for the deflection of the joint shafts in the drive mechanism to have equal value, and also these shafts can be made the same length.

Figs. 1 and 2 show diagrammatically the arrangement of the drive axles 14 and 15 in traversing curves, these axles deflecting about the vertical axis $a$, corresponding with 16 in Figs. 5 to 12, of the vehicle coupling, with which the chassis elements are coupled and can set themselves radially with respect to the center of the curvature O of the curve.

In Fig. 1 is shown the power transmission for two adjacent rigid axles, the drive shafts $b$ and $c$, (designated 17, 18 in Figs. 5 and 6) to be placed in driving connection, are provided at the ends with joints $d$, $e$, $f$, and $g$. The two inner joints $e$ and $f$ are connected by a link $h$ (designated 45 in Fig. 10). This connecting member is journalled in a casing which, as explained in connection with Figs. 6 to 12, can rock about the vertical pivot pin 16 of the coupling. When traversing a curve the housing 32 is turned into such a position by the vehicle elements 12 and 13 Fig. 3, that the drive shafts $b$ and $c$ in driving connection with each other, lie at equal angles to the bearing casing. The location of the bearing casing for the intermediate member $h$ connecting the jointed shafts, is obtained as described in connection with Figs. 5 and 12, by means of a gear set and a crank.

The setting of the drive shafts $b$ and $c$ causes the elongations and shortenings of these shafts $b$ and $c$ to be equally distributed.

Fig. 2 shows the arrangement of the drive shafts for swinging half axles corresponding to Figs. 5 and 6. In this case each half axle has a separate drive. Also each pair of shafts $b_1$, $c_1$, and $b_2$, $c_2$ placed in driving connection, is connected by an intermediate member $h_1$ and $h_2$ and these two intermediate members, as described in connection with Figs. 7 and 9 are journalled in the common support 1 designated 27 in Figs. 7 to 9 which can rock about the vertical coupling axis $a$, designated 16 in Figs. 7 to 9. When traversing a curve the support 1 is positioned by the coupled vehicles, which can rock about the vertical coupling axis $a$. If the vehicle axles or vehicle elements in rounding a curve lie at angle $r$ to each other then the member will turn through an angle $r/2$ which, as explained in connection with Fig. 7, is due to the gear segment assembly. In this position each of the intermediate members $h_1$, $h_2$, form similar angles $r/2$ and the shafts $b_1$, $c_1$ and $b_2$, $c_2$ are of equal length. When traversing a curve the inner shafts $b_1$, $c_1$ undergo shortening and the outer shafts $b_2$, $c_2$, an elongation. These length changes are taken care of by the telescopic construction of the drive shafts and the intermediate members $h_1$, $h_2$ causes the length variations to be equally distributed between the shafts.

For the sake of clearness, in Fig. 3 only one of the two shafts is shown lying at an angle $r$, the shaft of the other axle being in the direction of linear travel.

To make possible movement of successive axles to different levels when traveling over uneven ground, the arrangement is such that the intermediate members $h_1$, $h_2$ can also rock about a horizontal axis. The turning about the horizontal axis is effected by means of the chassis members and a crank mechanism as described in connection with Figs. 5 to 12. This also gives the result that a vertical line drawn on the connecting members $h_1$, $h_2$ will bisect the angle W (Fig. 4) corresponding to the difference in height between the successive axles, and which in the vertical plane is enclosed by the radii which pass through the center of the axles at right angles to the ground. In this position the connecting member $h_1$ makes equal angles $W_1 = W_2$, Fig. 4, with the connected drive shafts.

Figs. 13 to 15 show a device for uncoupling the vehicles in which the bearing block 24 of Figs. 5 to 12 is made in two parts. One part 51 is mounted in a bearing support 52 and is held therein by a nut 53 on the end of the pin 54, the latter of which is connected to the vertical bearing housing 51. When the vehicles are to be uncoupled the nut 53 is removed and the pin 54 will be pulled from the support 52, the housing 51 and pin 54 being connected to the leading vehicle and the bearing support 52 being connected to the trailer vehicle. To ensure a more perfect insertion of the pin 54 in the support 52 the latter may be provided with flared surfaces or flanges 55. When uncoupling the vehicle, all the mechanically moved parts remain on one coupling part, the bearing housing 51, and thus the uncoupling is executed in the simplest way by taking out the pin 54.

I claim as my invention:

1. A combined coupling and drive mechanism for the drive axles of the wheels of vehicles, comprising drive shafts, coupling means having a vertical pivot, and means intermediate to and supporting the two drive shafts and in rotatable cooperation with the coupling means around the vertical pivot, said last-mentioned means being automatically angularly adjustable relative to said drive shafts.

2. A combined coupling and drive mechanism, according to claim 1, in which the angular movement of the intermediate means is a fraction of the angular movement of the two drive shafts.

3. A combined coupling and drive mechanism, according to claim 1, in which the pivot provided in the coupling means permits the coupling means and drive shafts to be automatically adjusted around a vertical axis.

4. A combined coupling and drive mechanism, according to claim 1, in which the pivot provided in the coupling means permits the coupling means and drive shafts to be automatically adjusted around a vertical axis, and simultaneously maintaining the angles of the drive shafts equal, relative to the intermediate member.

5. A combined coupling and drive mechanism, according to claim 1, in which the pivot provided in the coupling means permits the coupling means and drive shafts to be automatically adjusted around a vertical axis, and simultaneously maintaining the angles of the drive shafts equal, relative to the intermediate member, and in which a gearing is provided to simultaneously maintain the angles of the drive shafts equal, relative to the intermediate member.

6. Drive mechanism for the axles of two coupled vehicles, comprising drive shafts for the axles to be driven, a drive connection between the drive shafts, coupling means for the two vehicles at the drive connection, and an intermediate member mounted in the coupling means, said member being journalled in the coupling means in rotary connection with a member on one of the two coupled vehicles, said last-named member being pivotable about a vertical pivot axis of the coupling means.

7. Drive mechanism, according to claim 6 in which the coupling means between the vehicles is pivotable at least about the vertical axis and in which the intermediate member forms a support for the drive shafts and is pivotably arranged about said vertical axis and in operative engagement with that vehicle member which is pivotable about the vertical coupling axis.

8. Drive mechanism, according to claim 6 in which a support is provided in which the intermediate member is journalled, said intermediate member being pivotable about the vertical coupling axis and having rotary connection with the vehicle member which pivots about said axis.

9. Drive mechanism, according to claim 6 in which a support is provided in which the intermediate member is journalled, said intermediate member being pivotable about the vertical coupling axis and having rotary connection with the vehicle member which pivots about said axis, and in which a reduction gear is provided between the support for the intermediate member and the coupling means, said reduction gear being adapted to so reduce the movement in the coupling means about the vertical axis imparted to the intermediate member when one vehicle changes its direction of travel relative to the other vehicle, that the deflections of the intermediate member are reduced to a fraction of the deflections of the coupling means.

10. Drive mechanism, according to claim 6 in which a support is provided in which the intermediate member is journalled, said intermediate member being pivotable about the vertical coupling axis and having rotary connection with the vehicle member which pivots about said axis, and in which a reduction gear is provided between the support for the intermediate member and the coupling means, said reduction gear being adapted to so reduce the movement in the coupling means about the vertical axis imparted to the intermediate member that the deflections of the intermediate member are reduced to one half the movement about the vertical coupling axis when one vehicle changes its direction of travel relative to the other vehicle.

11. Drive mechanism, according to claim 6 in which a support is provided in which the intermediate member is journalled, said intermediate member being pivotable about the vertical coupling axis and having rotary connection with the vehicle member which pivots about said axis, and in which a reduction gear is provided between the coupling means and the support for the intermediate member, said reduction gear being adapted to so reduce the movement in the coupling about the vertical axis imparted to the intermediate member that the deflections of the intermediate member are reduced to a fraction of the deflections of the coupling when one vehicle changes its direction of travel relative to the other vehicle, and a bearing casing in which the intermediate driving connecton member is pivotally mounted, said casing being rotatably journalled in the coupling and the drive shafts and their joints being mounted in said intermediate member.

12. Drive mechanism, according to claim 6 in which said coupling means between the axles to be coupled is characterized by having both vertical and horizontal pivotal axes, one of the vehicles to be coupled having a vertical pivot pin with which is connected a horizontal pivot pin in the other vehicle.

13. Drive mechanism, according to claim 6, in which an auxiliary support is provided in which the intermediate member is journalled and which is pivotable about the vertical coupling axis and is rotatably mounted co-axially with a horizontal coupling axis.

14. Drive mechanism, according to claim 6, in which a slide member is provided rotatably mounted about a horizontal coupling axis and having a guide member and link members connecting it to the elements to be coupled in such a manner that each vertical movement of a vehicle produces a movement of the slide whereby the intermediate member is displaced with reduction to a fraction of the actual angular displacement which occurs when one vehicle changes its direction of travel relative to the other vehicle.

15. Drive mechanism according to claim 6, in which means are provided to prevent the coupling means from contacting with the ground when considerable irregularities thereof are encountered.

ZSIGMOND HOLLÓS.